United States Patent [19]

Kawade et al.

[11] Patent Number: 4,579,368
[45] Date of Patent: Apr. 1, 1986

[54] SEAT BELT ANCHORING MECHANISM FOR CARS

[75] Inventors: Tateo Kawade, Saitama; Norio Miyashita, Tokyo; Norio Mugikura, Saitama, all of Japan

[73] Assignee: Honda Giken Kogyo Kabushiki Kaisha, Tokyo, Japan

[21] Appl. No.: 535,949

[22] Filed: Sep. 26, 1983

[30] Foreign Application Priority Data

Sep. 24, 1982 [JP] Japan ................................ 57-167004

[51] Int. Cl.$^4$ ............................................. B60R 22/00
[52] U.S. Cl. ............................................. 280/808; 297/483
[58] Field of Search ............... 280/801, 802, 804, 807, 280/808; 297/481, 482, 483, 486; 180/336

[56] References Cited

U.S. PATENT DOCUMENTS 4,389,059 6/1983 Stephenson ................. 280/808

FOREIGN PATENT DOCUMENTS

| 86633 | 8/1983 | European Pat. Off. | 280/801 |
| 2655995 | 6/1978 | Fed. Rep. of Germany | 297/483 |
| 134332 | 8/1982 | Japan | 180/336 |
| 1599643 | 10/1981 | United Kingdom | 280/808 |

Primary Examiner—Joseph F. Peters, Jr.
Assistant Examiner—Ross Weaver
Attorney, Agent, or Firm—Lyon & Lyon

[57] ABSTRACT

A seat belt anchoring mechanism for a car including a passenger room, a seat belt and a pillar portion covered with a garnish at the room interior side. A rotatable anchor plate supporting the shoulder harness portion of the seat belt arranged on the pillar portion with a cover and an operation lever rotatable together. A guide rail is provided at the room exterior side of the garnish and secured to the pillar portion, the guide rail having a plurality of engagement slots arranged in the longitudinal direction and a locking member is resiliently biased to be engaged with any of the engagement portions with a mobile member carrying the locking member and connected with the anchor plate so as to be movable therewith along the guide rail. An actuation mechanism causes movement of the locking member to effect the disengagement from the engagement with one of the engagement portions in accordance with the operation of the operation lever.

6 Claims, 26 Drawing Figures

SEAT BELT ANCHORING MECHANISM FOR CARS

The present invention relates to a seat belt anchoring mechanism for cars. Particularly, it relates to a seat belt anchoring mechanism for a car having a seat belt with a shoulder belt for the passenger, including a belt anchor threaded with and adapted for guidably anchoring the seat belt.

There have been known a variety of seat belt anchoring mechanisms for cars, in which the seat belt has a shoulder belt adapted to pass from around the passenger's chest to over the shoulder that is slidably guidedly passed through and anchored with a belt anchor provided on a pillar portion of the car body.

With such conventional seat belt anchoring mechanisms for cars, in which in general a belt anchor is secured to a pillar portion of the car body, it is not always easy for the passenger to put on a seat belt anchored at the best position in respect of his physique.

On this account, there have been proposed a number of seat belt anchoring mechanisms for cars, improved in that a belt anchor is adjustable of the level of fixing position.

In Japanese Utility Model (Publication) No. 55-119748, there is disclosed a seat belt anchoring mechanism for cars, in which a plurality of anchor fixing holes are vertically arranged at intervals and, each time when adjusting the fixing position, the belt anchor is removed from one of the fixing holes and then fixed to another. However, there are such disadvantages that the belt anchor, which requires removal for adjusting the fixing position, may not be considered to be of the best construction for one of the most important safety parts of the car and that, between respective neighboring ones of the fixing positions, the interval may well be relatively large, thus hardly permitting a precise adjustment.

As a substitute for the above, in Japanese Utility Model (Publication) No. 55-125344 there is proposed another seat belt anchoring mechanism for cars, in which a belt anchor is pivotally fitted on the head part of an axially movable bolt member normally biased with a spring, the bolt member having an engagement projection provided on the stem part thereof, and a plurality of engagement notches are arranged in a vertically spaced manner on the car body side. When adjusting the level of the fixing position of the belt anchor, the bolt member is to be pressed to disengage the projection on the anchor side from one of the notches on the car body side and then to be vertically slid as desired along a guide slot provided on the car body side, before permitting the projection to again engage with another notch. According to this proposal, the head part of the bolt member constitutes an operating element exposed to the interior of the passenger room of the car, which element may cause the projection to be disengaged unintentionally when a passenger or certain article happens to hit thereagainst, thus resulting in an unexpected displacement of the belt anchor. Therefore, this proposal is not completely satisfactory for a firm anchoring.

Among other prior art, Japanese Patent Publication No. 57-3659, proposes still another seat belt anchoring mechanism for cars in which a slider supporting a belt anchor is arranged to be vertically slidable along a guide rail secured to a pillar portion of the car body and operable with an operation button provided on the side of the guide rail for the selection of a locking position. In this proposal, however, the guide rail is not covered with the garnish of the pillar portion but rather is exposed to the interior of the passenger room of the car, thus having an unfavorable appearance. Moreover, this operation button type unit has a fixed position which is inconvenient, as compared to a belt anchor that will rotate when adjusted for the fixing level under the condition of a seat belt passing therethrough being put on a passenger.

The present invention has been achieved to favorably overcome such disadvantages and drawbacks of conventional seat belt anchoring mechanisms for cars.

An object of the present invention is to provide an anchoring mechanism for the shoulder harness of a seat belt for cars which permits a precise level adjustment and firm locking of a belt anchor as well as improved appearance and a favorable operability, while concurrently exhibiting conventional advantageous functions.

According to the present invention, there is provided a seat belt anchoring mechanism for the passenger room of a car with a pillar portion covered with a garnish on the room interior side, wherein a rotatable anchor member is adapted for supporting the seat belt and arranged on the pillar portion with a cover member fitted on the anchor member and a locking member engages a guide rail on the pillar having a plurality of engagement portions arranged in the longitudinal direction thereof, with an actuation mechanism for actuating the locking member to effect the disengagement thereof from and to permit the engagement with any of the engagement portions to change the position of the anchor member.

The above and further features, objects and advantages of the present invention will more fully appear from the following detailed description of the preferred embodiments of the invention when the same is read in conjunction with the accompanying drawings.

Figure 1:
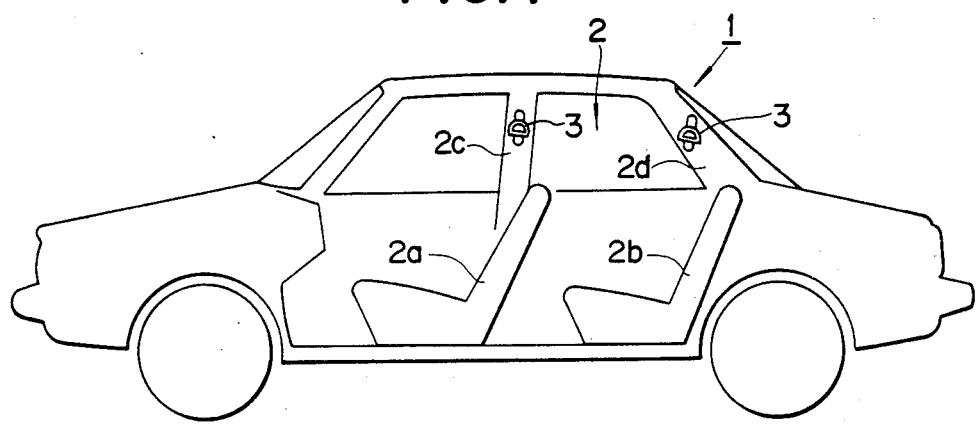
FIG. 1 is an explanatory schematic side view of a passenger car provided with a number of seat belt anchoring mechanisms according to a first embodiment of the invention.

Referring first to FIG. 1, generally designated by reference character 1 is a four-seated passenger car. The passenger car 1 includes a passenger room 2 provided with a pair of front seats 2a and a pair of rear seats 2b. In the longitudinally central part of the passenger room 2 and the rear part thereof, there are arranged on the left and right, that is, on the respective transversely outer sides of the front seats 2a and the rear seats 2b, a pair of center pillars 2c and a pair of rear pillars 2d, respectively. The four pillars 2c and 2d each have a belt anchor 3 provided on the respective upper halves thereof. The four belt anchors 3 are substantially of the same structure and, for convenience, only the one on the right side center pillar 2c will be described hereinbelow.

Figure 2:
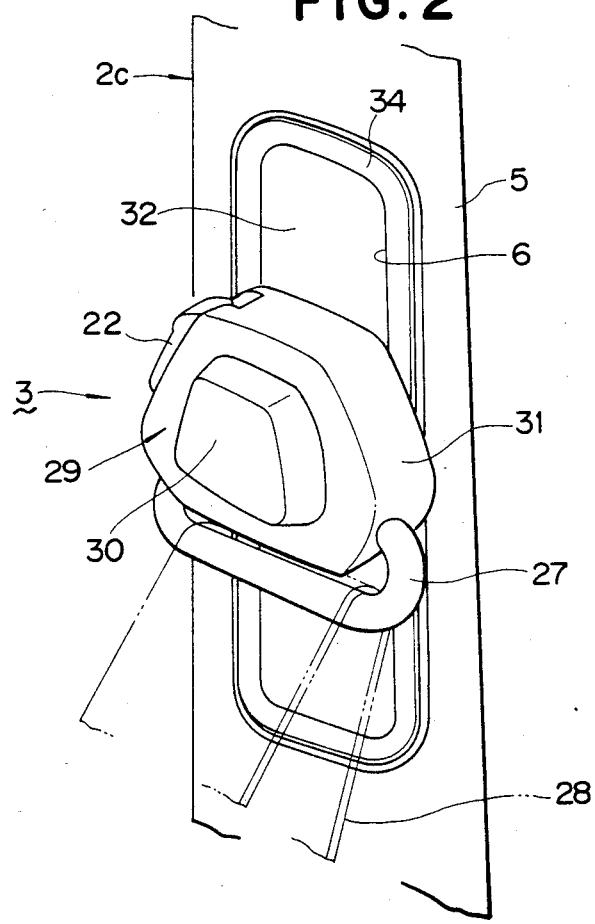
FIG. 2 is an enlarged perspective illustration of one of the seat belt anchoring mechanism of FIG. 1 as viewed from the interior of the passenger compartment.
Figure 16:
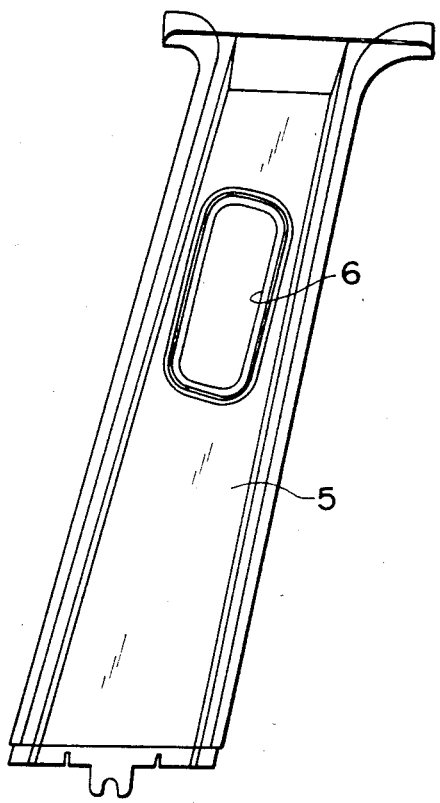
FIG. 16 is a front view of the pillar garnish of FIG. 15.
Figure 15:
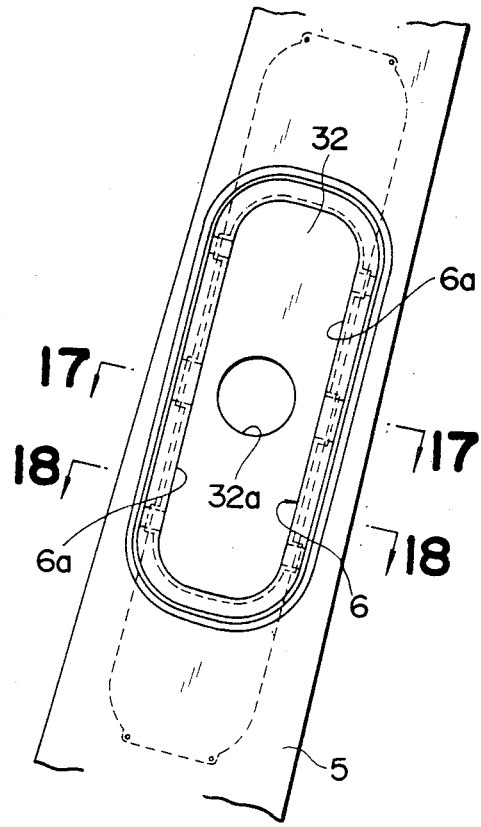
FIG. 15 is a front view of a pillar garnish and a cover plate for the seat belt anchoring mechanism of FIG. 2.
Figure 17:
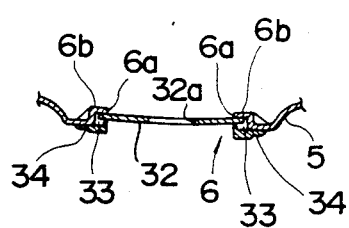
FIG. 17 is a cross section taken along line "17"—"17" of FIG. 15.
Figure 18:
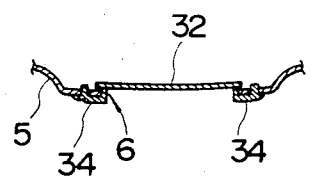
FIG. 18 is a cross section taken along line "18"—"18" of FIG. 15.
Figure 19:
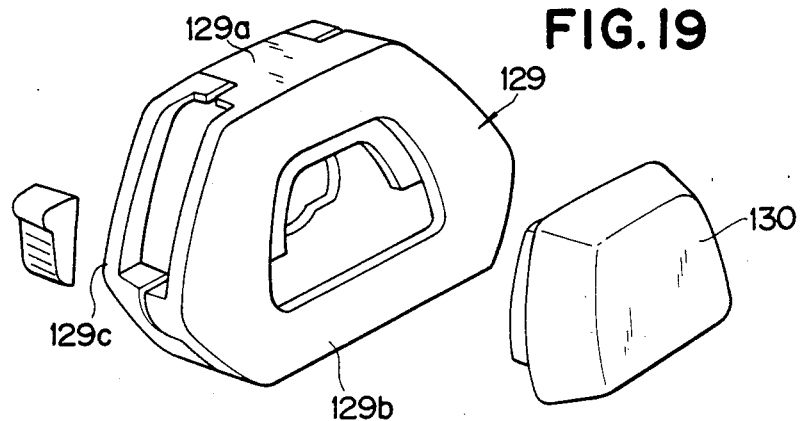
FIG. 19 is an exploded front perspective view of an anchor cover member for a seat belt anchoring mechanism according to a second embodiment of the invention.
Figure 20:
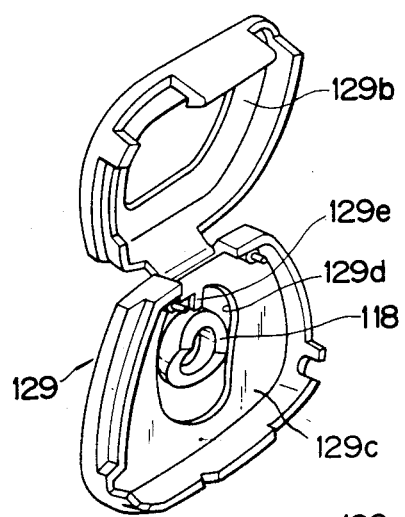
FIG. 20 is an explanatory front perspective view of the cover member, as opened, of FIG. 19.
Figure 21:
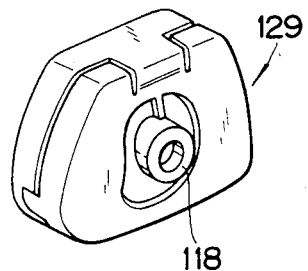
FIG. 21 is a rear perspective view of the cover member, as closed, of FIG. 19.

Referring now to FIG. 2, with reference to FIGS. 15 to 18, designated at reference character 5 is a pillar garnish of the right center pillar 2c, constituting a passenger room interior decoration member. The garnish 5 is formed therethrough, in the laterally central part of the upper half thereof, with an opening 6 vertically elongated as shown in FIG. 16. The opening 6 has, on both lateral sides 6a, 6a thereof, a plurality of stepped portions 6b raised inwardly of the pillar 2c and, along the circumference thereof, a decoration frame 34 attached thereto from the interior of the passenger room 2 and provided with a plurality of support pieces 33, as shown in FIGS. 15, 17 and 18, thereby vertically slidably holding a cover plate 32, while restricting the widthwise movement thereof. The cover plate 32 closes the opening 6 from inside of the center pillar 2c and is formed in the central part thereof with a through hole 32a communicating with the inside of the center pillar 2c. The before-mentioned belt anchor 3 is arranged on the center pillar 2c in a later described manner so as to be vertically movable with the cover plate 32 and lockable at a plurality of predetermined levels. As shown in FIG. 2, the belt anchor includes a through link 27 for slidably guiding a passenger's shoulder belt 28 passing therethrough, an anchor cover 29 incorporating a later described anchor mechanism and swingably holding the through link 27, the anchor cover 29 consisting of a portion 30 bulged inwardly of the passenger room 2 and a base portion 31 wider than the opening 6, and a manual operation knob 22 provided on either lateral side of the base portion 31 for effecting an engagement and disengagement of the belt anchor 3 relative to the center pillar 2c.

Figure 3:
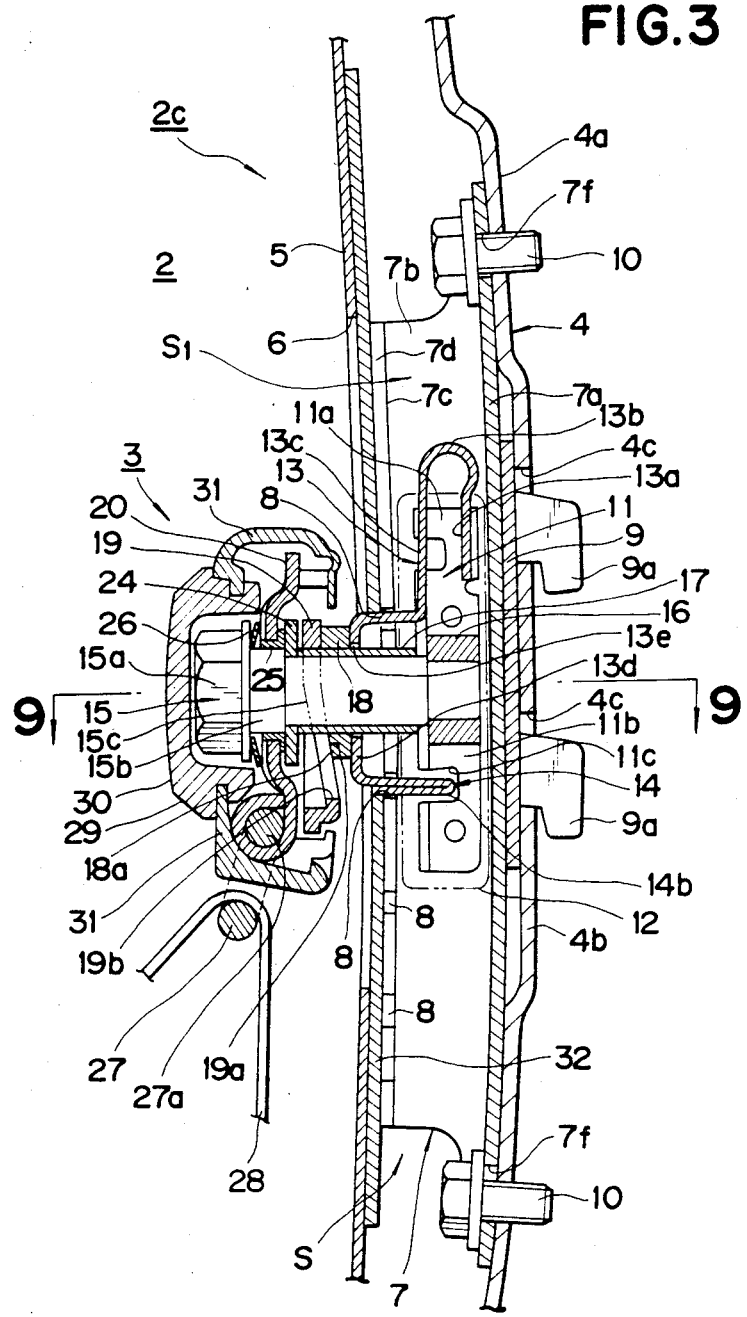
FIG. 3 is a detailed longitudinal sectional view of the seat belt anchoring mechanism of FIG. 2.

Referring now to FIG. 3 with reference to FIGS. 4 to 14, the center pillar 2c consists of the pillar garnish 5 as an interior member with respect to the passenger room 2, a pillar frame (not shown) as an exterior member relative thereto, and an inner panel 4 interposed therebetween. The inner panel 4 has an intermediate portion 4a thereof bulged transversely outwardly of the passenger room 2 and a pillar inner space S defined between the intermediate portion 4a and the garnish 5, the inner space S being relatively wide in the transverse direction and opened through the opening 6 to the passenger room 2. In this inner space S, there is provided a guide rail 7 for vertically guiding the belt anchor 3.

Figure 7:
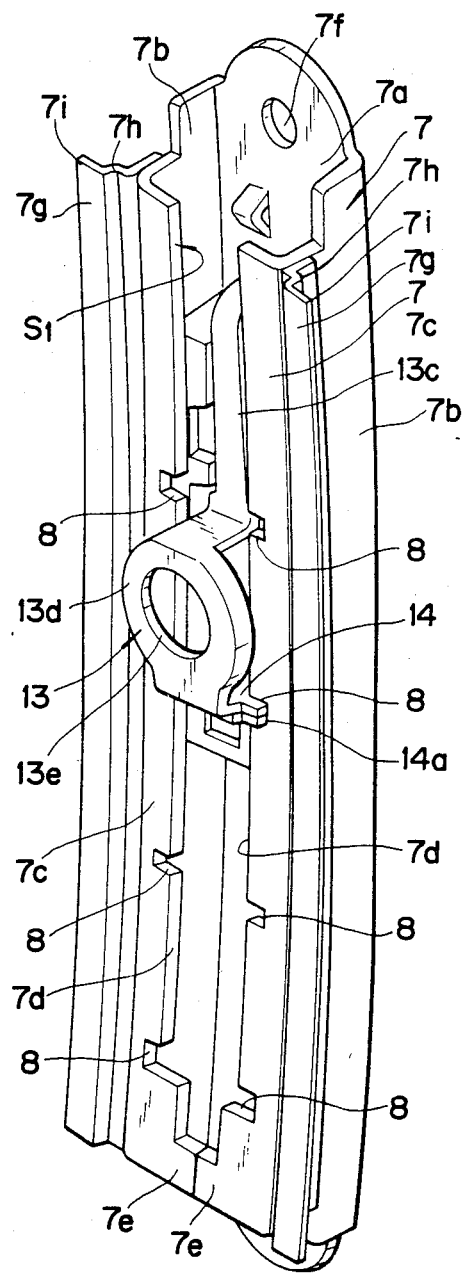
FIG. 7 is a perspective front view of the seat belt anchoring mechanism of FIG. 3, including the guide rail.
Figure 8:
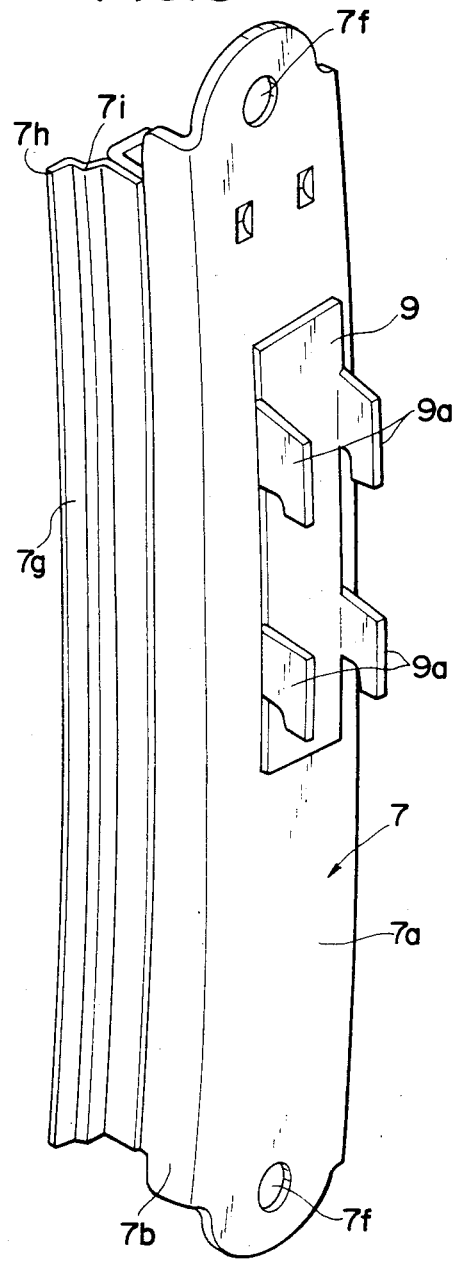
FIG. 8 is a perspective rear view of the elements shown in FIG. 7.

As shown in FIGS. 7 and 8, the guide rail 7 is shaped substantially in the form of a channel and comprises a base portion 7a vertically extending substantially straight, a pair of side portions 7b, 7b bent to extend at substantially a right angle from both sides of the base portion 7a, and a pair of edge portions 7c, 7c bent substantially parallel to the base portion 7a from the respective distal sides of the side portions 7b, 7b so as to have their distal edges 7d, 7d defining a gap G vertically extending with a predetermined width and upwardly opening and their lower end parts 7e, 7e butt-jointed with each other. On respective outsides of the side portions 7b, 7b, there is jointed a pair of linear pieces 7g, 7g consisting of a pair of stepped portions 7h, 7h for supporting the cover plate 32 from the back and a pair of flange portions 7i, 7i engaging the back of the garnish 5. The base portion 7a has a pair of fixing holes 7f, 7f formed in the upper and the lower ends thereof and a mount plate 9 jointed on the back thereof and provided with upper and lower pairs of hooks 9a standing transversely outwards therefrom. Moreover, in the distal edges 7d, 7d of the edge portions 7c, 7c, there are formed a plurality of vertically spaced pairs of notches 8, for example four pairs of notches 8 are shown in this embodiment, with each pair of notches 8 being provided at the same level with each other. The above-described rail 7 is vertically arranged in the inner space S and, as shown in FIG. 3, is hooked by the hooks 9a to upper and lower pairs of hooking holes 4c formed through a portion 4b concaved outwardly of the passenger room 2, in the intermediate portion 4a of the inner panel 4, and secured to the inner panel 4 by means of a pair of bolts 10, 10 applied through the upper and lower fixing holes 7f, 7f of the base portion 7a.

Figure 5:
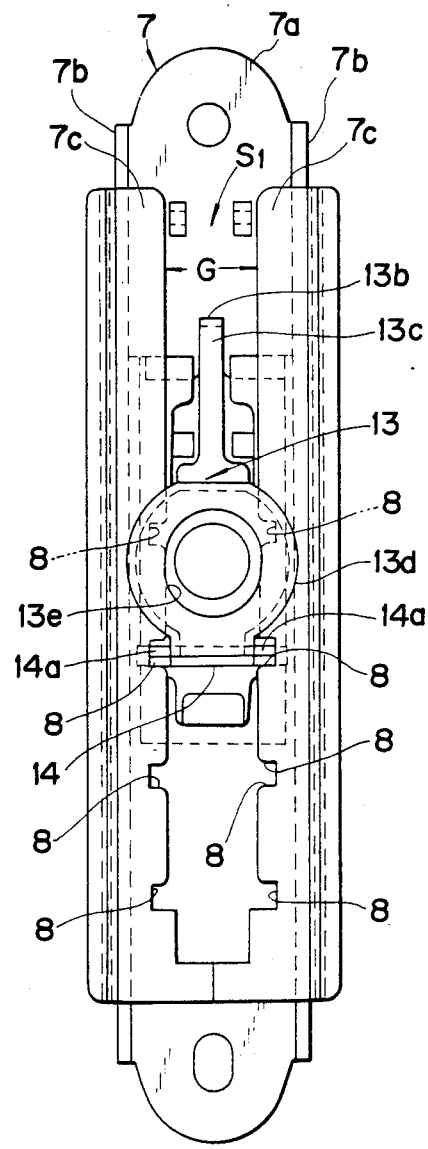
FIG. 5 is a front view of the seat belt anchoring mechanism of FIG. 3 with portions removed for showing the slider and resilient locking member.
Figure 6:
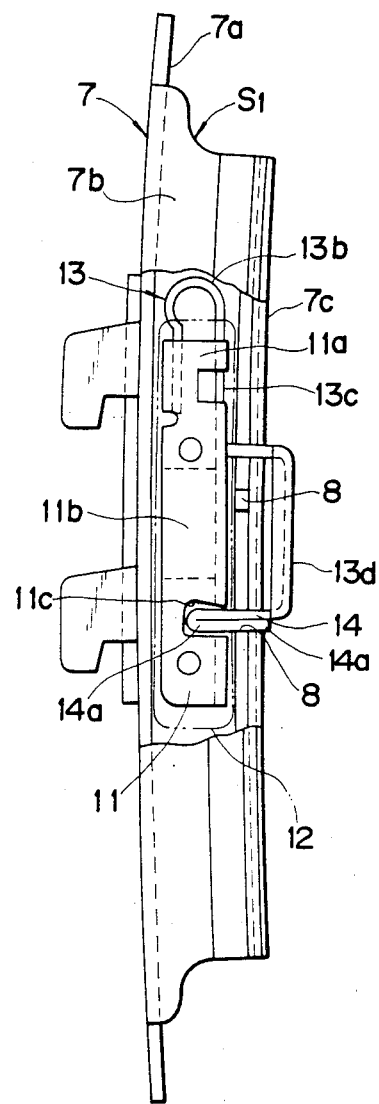
FIG. 6 is a side view of the elements shown in FIG. 5, with a portion cut away.

As shown in FIGS. 5 and 6, in a rail inner space S defined by the base portion 7a, the side portions 7b, 7b and the edge portions 7c, 7c of the guide rail 7, there is vertically slidably fitted a slider 11 covered with a cover member 12 composed of such as a synthetic resin having a relatively small friction factor and comprising an upper enclosure portion 11a substantially rectangular in cross section and a channel portion 11b extending downwardly of the enclosure portion 11a and having the cross-sectional form of a channel opened outwardly from the passenger room 2. The channel portion 11b is formed in the lower part thereof with a recess 11c on the interior side with respect to the passenger room 2. The slider 11 is integrally provided with a resilient locking member 13 adapted for locking the vertical sliding of the slider 11 at a plurality of predetermined levels. As is apparent from FIGS. 10 to 12, the locking member 13 comprises a channel-like base portion 13a to be fitted in and fixed to the enclosure portion 11a of the slider 11, a semi-circular curved portion 13b extending upwardly from the portion 13a and making a downturn to face downward, the curved portion 13b having a relatively narrow width, a connecting spring portion 13c extending downwardly with the same width as the curved portion 13b, a boss portion 13d bent from the lower end of the spring portion 13c in the opposite direction relative to the base portion 13a and again downwardly bent at the distal end thereof to constitute a ring-like form relatively large in the outside diameter and having a bolt hole 13e formed therethrough with an inside diameter somewhat smaller than the aforementioned gap G of the guide rail 7, and a flat locking portion 14 bent back substantially at a right angle from the lower end of the boss portion 13d. The locking portion 14 has a distal end part 14b thereof which becomes loose-fitted in the recess 11c of the slider 11 when the locking member 13 is fixed to the slider 11. Moreover, when the slider 11 is assembled with the locking member 13 and fitted in the guide rail 7, as shown in FIG. 3, the boss portion 13d of the locking member 13 passes through the gap G and is slidably fitted in the through hole 32a of the cover plate 32 and projects beyond the opening 6 of the garnish 5 into the passenger room 2, while the locking portion 14 has both side parts 14a, 14a thereof engageable with and disengageable from any pair of notches 8, 8. Further, in the channel portion 11b of the slider 11, as shown in FIG. 3, an anchor bolt 15, as the carrier member of the belt anchor 3, is inserted from inside of the passenger room 2 through the bolt hole 13e and the gap G and secured with a nut 16. The anchor bolt 15 consists of a head portion 15a of a relatively large diameter, a neck portion 15b with a smaller diameter and a stem portion 15c with a diameter further smaller. On the stem portion 15c with a diameter further smaller. On the stem portion 15c, there is fitted a spacer collar 17 with an outside diameter smaller than the diameter of the above mentioned bolt hole 13e. On this collar 17, as shown in FIGS. 3 and 9, there is fitted a guide cam 18 abutting at its exterior side (relative to the passenger room 2) on the interior face of the boss portion 13d of the locking member 13 and constituting at the interior side a tapered cam surface 18a.

Figure 4:
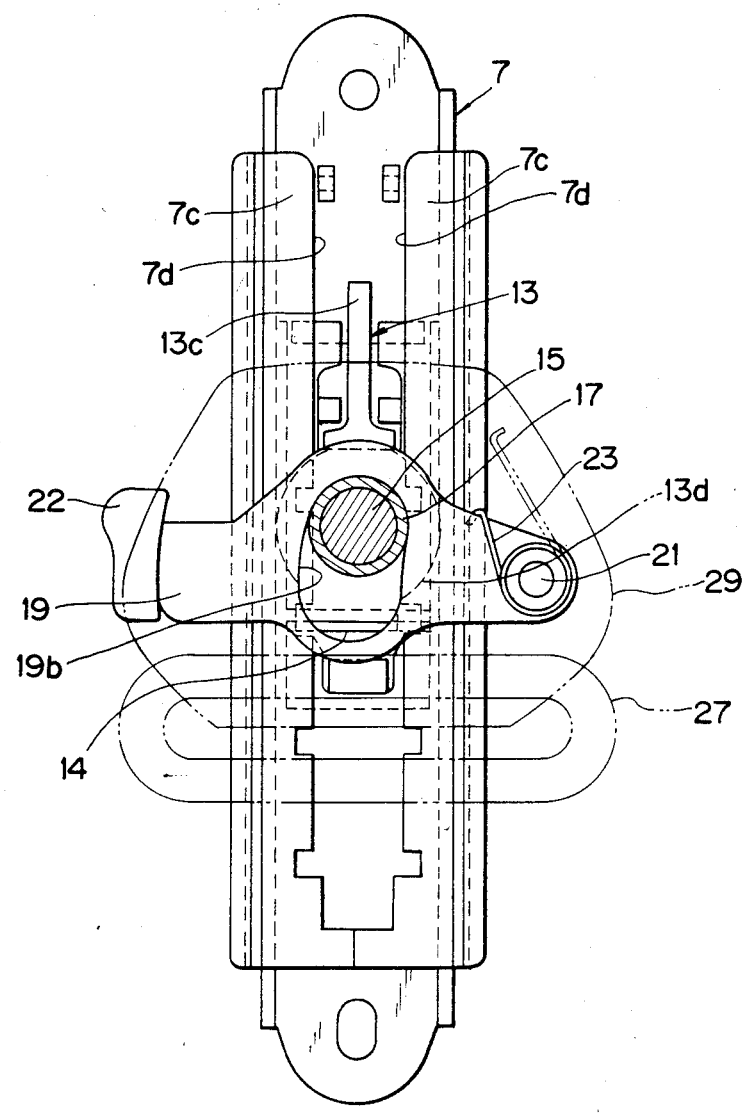
FIG. 4 is a front view of the seat belt anchoring mechanism of FIG. 3, including an operation lever.
Figure 9:
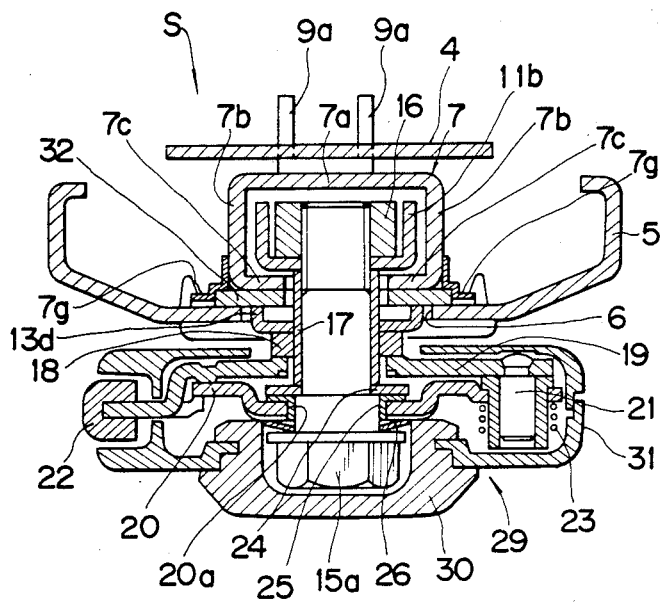
FIG. 9 is a cross sectional view taken along line "9"—"9" of FIG. 3.
Figure 10:
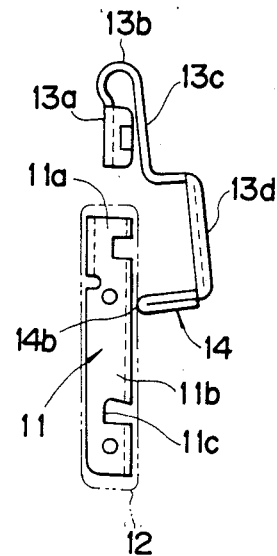
FIG. 10 is an exploded side view of the slider and the locking member of FIG. 5.
Figure 11:
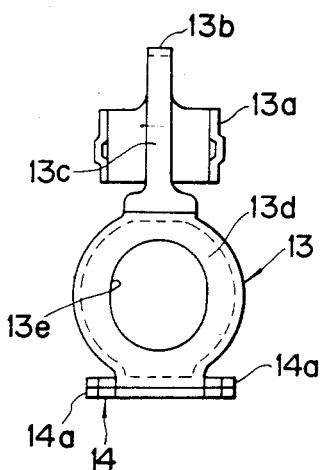
FIG. 11 is an enlarged front view of the locking member of FIG. 10.
Figure 12:
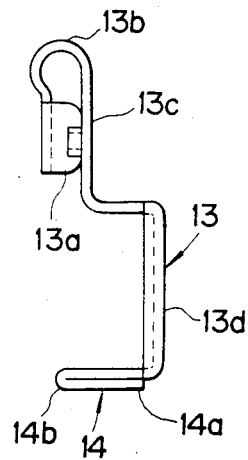
FIG. 12 is a side view of the locking member FIG. 11.
Figure 14:
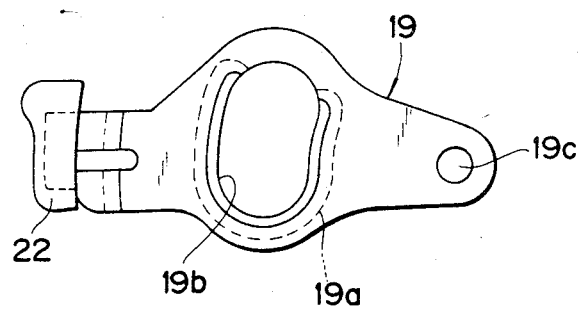
FIG. 14 is a front view of the operation lever of FIG. 13.

As shown in FIGS. 3, 4 and 9, on the interior side of the guide cam 18 there is an operation lever 19 having in the central part thereof an arcuately elongated hole 19b formed therethrough and loose-fitted on the collar 17 and on the exterior side, around the elongated hole 19b, an operation cam surface 19a sloped to pushably abut on the tapered cam surface 18a of the guide cam 18. The operation lever 19 is shaped in a platelike form that is vertically wider at the central part thereof as shown in FIG. 14 and pivoted as shown in FIGS. 4 and 9 at either end thereof (at the right end in this embodiment) on the corresponding end of an anchor plate 20 supporting the through link 27, by means of a pivot hole 19c formed through the lever 19 and pivotally fitted on a pin 21. Moreover, the operation lever 19 is provided at the opposite end thereof with an operation knob 22 to be pushed up by manual operation for allowing the level adjustment, and normally biased with a return spring 23 to an original position thereof or in the return direction thereof, that is, downwardly in FIG. 4.

Figure 13:
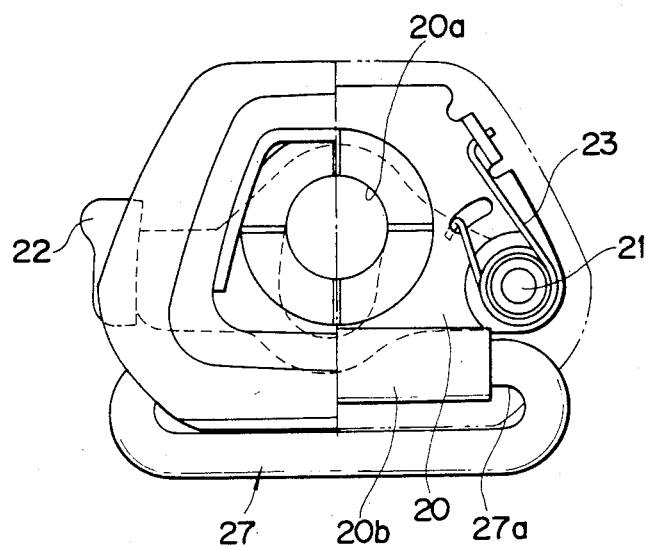
FIG. 13 is an enlarged front view, partly cut away in the left half and wholly in cross section on the right half, of a belt anchor shown in the seat belt anchoring mechanism of FIG. 3, including the operation lever of FIG. 4.

As shown in FIGS. 3 and 13, the anchor plate 20 has a looped portion 20b formed in the lower part thereof fitted on and adapted for swingably holding a horizontal rod portion 27a of the horizontally long through link 27 threaded with the shoulder belt 28. Further, the anchor plate 20 has at the central part thereof a fitting hole 20a formed therethrough as shown in FIG. 13 and fitted on a collar 25 on the neck portion 15b of the anchor bolt 15 so as to be rotatable thereabout, while there are interposed on the interior side (relative to the passenger room 2) a plate-like spring 26 between the anchor plate 20 and the head portion 15a of the anchor bolt 15 and on the exterior side a washer 24 between the neck portion 15c and the interior end of the spacer collar 17.

Further, as shown in FIGS. 3 and 9, the portion of the foregoing belt anchor mechanism from the boss portion 13d of the locking member 13 to the head portion 15a of the anchor bolt 15 is covered with the aforementioned anchor cover 29 consisting of the bulge portion 30 enclosing the head portion 15a and the base portion 31 enclosing the remaining portion. The anchor cover 29 is supported by the anchor plate 20 so as to be integrally rotatable therewith.

Turning now to a description of the function of the seat belt anchoring mechanism of this invention in relation to the first embodiment, the anchor plate 20 is permitted to rotate together with the anchor cover 29 about the anchor bolt 15, thus following incidental movements of the shoulder belt 28 slidably passed through the through link 27 for convenience, comfort and efficient operation. Assuming the belt anchor 3 is locked in the position of the second pair of notches 8, 8 as counted from the uppermost pair thereof, as illustrated, when the anchoring point is desired to be vertically changed to make the shoulder belt 28 fit the physique of a passenger, first the knob 22 of the operation lever 19 is pushed upwardly, as viewed in FIG. 4, causing the lever 19 to rotate upwardly about the pin 21, which rotation is permitted by the elongated hole 19b being loose-fitted on the anchor bolt 15. The sloped cam surface 19a of the lever 19 will also move upwardly, thus urging the guide cam 18, which has the tapered cam surface 18a engaged with the sloped cam surface 19a, and the boss portion 13d of the locking member 13, which is guided by the guide cam 18 in the axial direction of the anchor bolt 15, toward the inner panel 4 of the center pillar 2c, that is, to the right in FIG. 3, opposing the resilient force of the spring portion 13b of the locking member 13. Concurrently, the locking portion 14 also will move in the same direction, pushing the slider 11 back to the base portion 7a of the guide rail 7, causing the both side parts 14a, 14a of the locking portion 14 to be disengaged from the second pair of notches 8, 8. As the next step in the operation, the belt anchor 3 is moved up or down, as desired, along the gap G of the guide rail 7 to the position of another pair of notches 8, 8, where the knob 22 will be released to permit the locking portion 14a, 14a to be engaged with the desired pair of notches 8, 8 by the effect of the resilient force of the spring portion 13b.

As apparent from the foregoing description, according to this embodiment, the level adjustment of a belt anchor is favorably accomplished by the mere push of an operation knob and movement by hand of the entire anchor. Moreover, since the operation lever is integral with the anchor plate, the knob is integrally rotatable therewith, thus being enabled to keep a predetermined favorable position relative thereto as well as to an anchor cover, which provides ease of operation for the level adjustment of the belt anchor.

Figure 22:
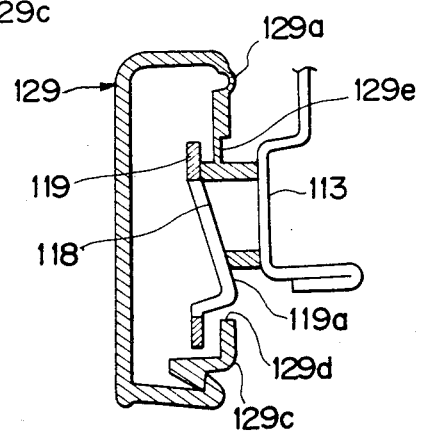
FIG. 22 is a longitudinal side section, of the seat belt anchor mechanism shown in FIGS. 19, 20 and 21.

Referring now to FIGS. 19 to 22 showing a second embodiment of the invention, designated at reference character 129 is an anchor cover. The anchor cover 129 is separated into a front cover 129b and a rear cover 129c and has a hinge connection 129a connecting them to each other. The front cover 129b has in the central part thereof a detachable bulge portion 130 fitted therein and adapted for the accommodation of the head part of an anchor bolt (not shown), and the rear cover 129c has in the central part thereof an opening 129d therethrough and a guide cam 118 integrally hinged to be suspended therefrom in the window 129d by means of a connection piece 129e. As shown in FIG. 22, the guide cam 118 is so arranged as to abut, at the interior side relative to a passenger room (not shown), on a sloped cam surface 119a of an operation lever 119 and, at the exterior side, on a resilient locking member 113, all similar to the positioning and interengagement of the guide cam 18, lever 19 and locking member described above in connection with the first embodiment. According to this second embodiment, in which a guide cam is provided as an integral part of an anchor cover, the number of component parts can be effectively reduced.

Figure 23:
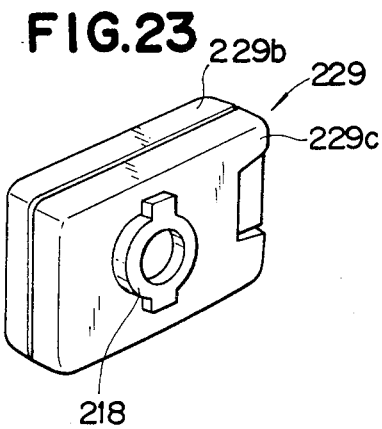
FIG. 23 is a rear perspective view of an anchor cover member for a seat belt anchoring mechanism according to a third embodiment of the invention.
Figure 24:
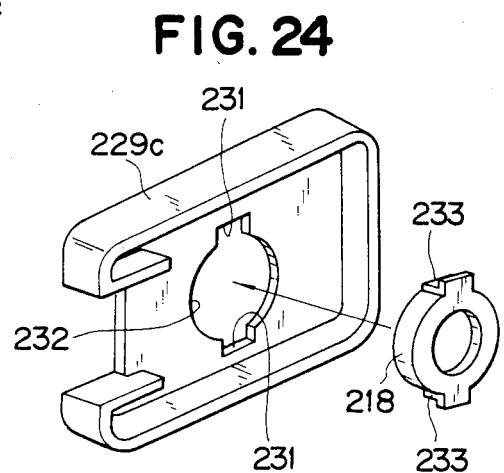
FIG. 24 is an exploded front perspective view of the cover member of FIG. 23.
Figure 25:
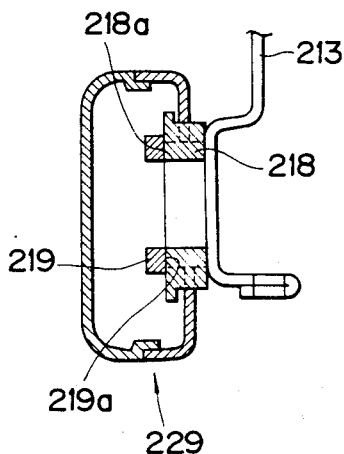
FIG. 25 is a longitudinal side section of the seat belt anchoring mechanism of FIG. 23.

Referring now to FIGS. 23 to 25 showing a third embodiment of the invention, designated by reference character 229 is an anchor cover having a front cover 229b facing the interior of a passenger room (not shown) of a car (not shown) and a rear cover 229c facing a pillar portion thereof. The front and rear covers 229b, 229c are shaped and dimensioned to be assembled with each other. The rear cover 229c has in the central part thereof a fitting hole 232 opened therethrough and there is formed in the upper and lower circumferential parts thereof a pair of engagement slots 231, 231. A guide cam 218 having on the outer circumference thereof a pair of engagement projections 233, 233 is adapted to fit in opening 232 with the projections 233, 233 in engagement with slots 231, 231, so that the guide cam 218 is integrally rotatable with the anchor cover 229. As shown in FIG. 25, the guide cam 218 is so arranged to abut, at the interior side relative to the passenger room, with a cam surface 218a thereof, on a cam surface 219a of an operation lever 219 and at the exterior side, on a resilient locking member 213, similar to those previously described.

Figure 26:
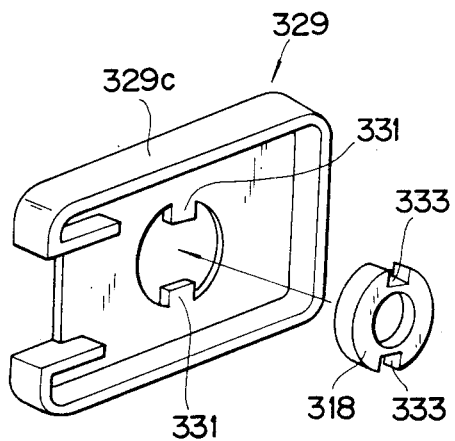
FIG. 26 is an exploded front perspective view of an anchor cover member of a seat belt anchoring mechanism according to a fourth embodiment of the invention.

Referring now to FIG. 26 showing a third embodiment of the invention, designated by reference character 329 is an anchor cover separable into a front cover (not shown) and a rear cover 329c, which has a pair of engagement projections 331, 331 adapted to engage a pair of engagement slots 333, 333 formed in the outer circumference of a guide cam 318, so that the guide cam 318 is integrally rotatable with the anchor cover 329.

As will be understood from the description hereinbefore, according to the present invention, there are a variety of advantages such that an operation member which constitutes an integral part with a belt anchor provides a relatively small projection into a passenger room, while being easy to operate. Moreover, the engagement between a locking piece and a plurality of notches provides a firm locking at an adjustable belt anchoring level, and the guiding along a rail favorably eliminates the fear of unexpected disengagement or erroneous operation. Further, the belt anchor level adjustment, accomplished by a simple vertical pushing operation without the need of detachment, providing a considerably more favorable operability, and that the simple vertical operation of a knob eliminates the disadvantages of prior devices using a horizontal operation in which erroneous operations can occur such as by a hit from an article or a person. Furthermore, by providing a rail in the pillar with a garnish cover plate slidably covering the gap for a different level adjustments the mechanism and the inside of the pillar is hidden to improve the beauty of appearance.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

What is claimed:

1. A seat belt anchoring mechanism for the passenger room of a car with at least one seat belt provided in the room and at least one pillar portion covered with a garnish at the room interior side, comprising:

a rotatable anchor member adapted for supporting the seat belt and arranged on the pillar portion;

a cover member fitted on said anchor member;

an operation member pivotally mounted for pivoting relative to said anchor member and said cover member;

a guide rail provided at the room exterior side of the garnish and secured to the pillar portion;

said guide rail having a plurality of longitudinally separated engagement portions arranged in the longitudinal direction thereof;

a locking member resiliently biased to be engaged with any of said engagement portions;

a mobile member carrying said locking member;

said mobile member being connected with said anchor member so as to be movable therewith along said guide rail; and actuating means for actuating said locking member to effect the disengagement thereof from and to permit the engagement thereof with any of said engagement portions in accordance with the pivotal operation movement of said operation member relative to said anchor member and cover member.

2. A seat belt anchoring mechanism according to claim 1, wherein:

said operation member is provided with a cam portion;

a cam member operable with said cam portion is interposed between said operation member and said locking member; and said cam member is integrally rotatable with said cover member.

3. A seat belt anchoring mechanism according to claim 2, wherein:

said cam member is hinged to be suspended from said cover member by means of a connection piece.

4. A seat belt anchoring mechanism according to claim 2, wherein:
said cam member and said cover member are formed with at least one engagement slot and the other with an engagement projection engaged with said engagement slot.

5. A seat belt anchoring mechanism according to claim 1, wherein:
said actuating means comprises a cam member abutting, at the room interior side, on said operation member and, at the room exterior side, on said locking member.

6. A seat belt anchoring mechanism for the passenger room of a car with at least one seat belt provided in the room and at least one pillar portion covered with a garnish at the room interior side, comprising:

a rotatable anchor member adapted for supporting the seat belt on the pillar portion;

a guide rail secured to the pillar portion and having a plurality of engagement portions arranged in the longitudinal direction thereof;

means including a locking member resiliently biased to be engaged selectively with any one of said engagement portions;

said means being rotatably connected to said anchor member so as to be movable therewith along said guide rail; and lever means mounted for pivotal movement relative to said anchor member for actuating said locking member to effect the disengagement of said locking member from and to permit the engagement thereof with any of said engagement portions in accordance with the operation of said lever means.

* * * * *